US009102572B2

(12) United States Patent
Shaw et al.

(10) Patent No.: US 9,102,572 B2
(45) Date of Patent: *Aug. 11, 2015

(54) UNIFORM TEXTURE FOR CONCRETE WALLS

(71) Applicant: LITHOCRETE, INC., Costa Mesa, CA (US)

(72) Inventors: Ronald D. Shaw, Corona del Mar, CA (US); Lee A. Shaw, Newport Beach, CA (US)

(73) Assignee: Lithocrete, Inc., Costa Mesa, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/456,628

(22) Filed: Aug. 11, 2014

(65) Prior Publication Data

US 2014/0346699 A1    Nov. 27, 2014

Related U.S. Application Data

(63) Continuation of application No. 14/062,058, filed on Oct. 24, 2013, which is a continuation of application No. 13/595,844, filed on Aug. 27, 2012, now abandoned, which is a continuation of application No. 12/837,389, filed on Jul. 15, 2010, now abandoned, which is a continuation of application No. 11/724,452, filed on Mar. 15, 2007, now Pat. No. 7,781,019.

(51) Int. Cl.
| | |
|---|---|
| C04B 41/00 | (2006.01) |
| C04B 28/02 | (2006.01) |
| C04B 41/50 | (2006.01) |
| C04B 111/00 | (2006.01) |

(52) U.S. Cl.
CPC ............. *C04B 41/0018* (2013.01); *C04B 28/02* (2013.01); *C04B 41/009* (2013.01); *C04B 41/5079* (2013.01); *C04B 2111/00612* (2013.01)

(58) Field of Classification Search
CPC ....................................................... C04B 28/02
See application file for complete search history.

(56) References Cited

U.S. PATENT DOCUMENTS

| | | | | |
|---|---|---|---|---|
| 1,637,321 | A * | 7/1927 | Johnson | 264/338 |
| 4,748,788 | A * | 6/1988 | Shaw et al. | 52/741.11 |
| 5,026,576 | A * | 6/1991 | Benvenuto et al. | 427/355 |
| 5,246,650 | A * | 9/1993 | Clark | 264/87 |
| 5,887,399 | A * | 3/1999 | Shaw et al. | 52/311.1 |
| 5,950,394 | A | 9/1999 | Shaw et al. | |
| 6,016,635 | A | 1/2000 | Shaw et al. | |
| 6,033,146 | A | 3/2000 | Shaw et al. | |
| 6,082,074 | A * | 7/2000 | Shaw et al. | 52/742.14 |
| 6,609,340 | B2 * | 8/2003 | Moore et al. | 52/309.11 |
| 6,907,708 | B2 * | 6/2005 | Naji et al. | 52/742.14 |
| 7,781,019 | B2 * | 8/2010 | Shaw et al. | 427/309 |
| 2002/0148195 | A1 * | 10/2002 | Ward | 52/742.1 |
| 2006/0180507 | A1 * | 8/2006 | DeHart et al. | 209/311 |

(Continued)

*Primary Examiner* — Nathan T Leong
(74) *Attorney, Agent, or Firm* — Stetina Brunda Garred & Brucker

(57) ABSTRACT

A method of forming a concrete wall having a substantially uniform exterior surface texture. The method includes the initial step of pouring concrete into a wall form. The concrete is poured from a first mixture and is allowed to cure. After the concrete is cured, the wall form is removed from the resultant concrete base structure. A roughened texture is then created on the base structure. A finishing mixture is then applied to the roughened texture. The finishing mixture may be created by separating the aggregate from a portion of the remaining first mixture. The finishing mixture creates a smooth texture on the exterior surfaces of the initially formed base structure.

7 Claims, 3 Drawing Sheets

(56) References Cited

U.S. PATENT DOCUMENTS

2007/0071550 A1   3/2007  Shaw
2007/0071551 A1*  3/2007  Shaw et al. .................... 404/75
2007/0086860 A1*  4/2007  Shaw et al. .................... 404/75
2007/0104538 A1   5/2007  Shaw

* cited by examiner

UNIFORM TEXTURE FOR CONCRETE WALLS

CROSS-REFERENCE TO RELATED APPLICATIONS

The present application is a continuation patent application of U.S. patent application Ser. No. 14/062,058 filed on Oct. 24, 2013, which is a continuation patent application of U.S. patent application Ser. No. 13/595,844 filed on Aug. 27, 2012, which is a continuation patent application of U.S. patent application Ser. No. 12/837,389 filed on Jul. 15, 2010, which is a continuation patent application of U.S. patent application Ser. No. 11/724,452 filed on Mar. 15, 2007, now U.S. Pat. No. 7,781,019 issued on Aug. 24, 2010, the entire contents of which are incorporated herein by reference.

STATEMENT RE: FEDERALLY SPONSORED RESEARCH/DEVELOPMENT

Not Applicable

BACKGROUND OF THE INVENTION

1. Field of the Invention

The present invention relates generally to cast in place concrete walls and, more particularly, to a method of forming a cast in place concrete wall wherein the resultant wall has a substantially smooth and uniform outer surface texture.

2. Description of the Related Art

As is well known in the construction industry, concrete is a commonly used material for the fabrication of walls and barriers. The desirability of the use of concrete as a construction material is attributable to certain characteristics that concrete possesses in comparison to other construction materials. More particularly, walls and barriers may be quickly and easily constructed through the use of concrete, with the concrete also imparting a high level of durability to such structures. In addition, the use of concrete for the fabrication of walls and barriers offers a high level of design flexibility since the concrete may be molded into many different shapes and arrangements. The concrete is also easily transportable to construction sites via concrete transport trucks.

Many of the concrete walls that are constructed in accordance with the current state of the art are referred to as cast in place walls. A concrete cast in place wall is typically constructed on-site rather than being manufactured at an off-site facility and subsequently transported to the construction site. The fabrication of a cast in place concrete wall typically begins with the construction of a concrete wall form. Subsequent to the construction of such form, concrete is poured thereinto and is given time to cure. Once the concrete has cured, the corresponding wall form is removed from the fully formed concrete structure. Upon the removal of the form, the exposed walls of the concrete structure may be sandblasted to apply a finishing texture thereto.

One of the deficiencies associated with the currently known cast in place wall construction methodology is that the resultant wall or other structure tends to have a roughened surface texture upon the removal of the form therefrom. In this regard, there tends to be slight inconsistencies in the overall finish of the wall or other structure, such inconsistencies being caused by any one of a number of different factors, including inconsistencies in the form work, sandblasting, finishing, concrete and/or the placing or pumping of the concrete into the form. Further, small holes or other indentations are often found throughout the exposed surfaces of the wall or other structure, such holes or other indentations being formed as a result of the entrapment of air during the forming process. These holes or other indentations are undesirable, in as much as they diminish the aesthetic appeal of the wall or other structure.

In order to avoid the surface finish inconsistencies highlighted above, there has been developed in the prior art a method of creating uniform texture concrete walls. In accordance with this methodology, the concrete wall is "pre cast," with the cast face of the wall being side down and the wall being erected into place through the use of a crane. However, this particular process is not well suited to forming concrete structures wherein multiple faces or sides of the structure are to be provided with a substantially uniform texture. The present invention addresses this need in the art by providing a methodology for forming concrete structures such as walls or barriers having substantially smooth or uniform exterior surface textures.

BRIEF SUMMARY OF THE INVENTION

In accordance with one aspect of the present invention, there is provided a method of forming a cast in place concrete wall having a substantially uniform exterior surface texture. As indicated above, concrete is a commonly used construction material that comprises aggregate of various shapes and sizes disposed in cement. The method of the present invention includes the initial step of constructing or assembling a concrete wall form in a suitable size and shape, and thereafter pouring a first concrete mixture into the wall form. The concrete poured from such first mixture is allowed to partially cure once poured into the form. Once the concrete is at least partially cured, the wall form is removed from the resultant base structure. Subsequent to the form removal, the cured concrete structure is subjected to a procedure which creates a roughened surface texture on the exposed exterior surfaces thereof. Such roughened surface texture may be formed through the use of a form retarder, a spray on retarder, sand blasting, acid washing, and/or chemical etching.

Subsequent to the roughening of the exposed surfaces of the base structure, a finishing mixture is then applied to such roughened surfaces. In accordance with the present invention, the finishing mixture may be created by separating the aggregate from a portion of the remainder of the first mixture used to initially form the base structure. However, such finishing mixture may also be formed by separating the aggregate from a second mixture of the concrete, wherein such second mixture is a separate batch of concrete from the first mixture. The finishing mixture, however derived, is applied to the initially formed base structure to create a smooth/uniform texture over the roughened exterior surfaces thereof. As will be recognized, the fully cured finishing mixture ultimately defines the exposed exterior surfaces of the concrete structure (e.g., a wall, barrier, etc) comprising the combination of the base structure having the finishing mixture applied thereto.

As is apparent from the foregoing, the present invention provides a method of constructing a concrete structure such as a cast in place wall having substantially more uniform exterior surface textures then those which can be achieved by the formation of cast in place walls using presently known techniques. By separating at least the large aggregate from the concrete batch used to create the finishing mixture, the application of such finishing mixture to the initially formed base structure is operative to cover any inconsistencies that may otherwise have been present in such base structure. It is contemplated that the finishing mixture may be applied through the use of a float which is operative to work the finishing mixture into any holes or other detents disposed in the initially formed base structure. The surface of the finishing mixture may also be troweled to achieve a harder texture. The exposed surface of the finishing mixture itself may also be acid washed after the finishing mixture is allowed to harden to a prescribed level.

These and other features, aspects and advantages of the present invention will become better understood with reference to the following drawings, description and claims.

BRIEF DESCRIPTION OF THE DRAWINGS

These and other features and advantages of the various embodiments disclosed herein will be better understood with respect to the following description and drawings, in which like numbers refer to like parts throughout, and in which.

Common reference numerals are used throughout the drawings and detailed description to indicate like elements.

DETAILED DESCRIPTION OF THE INVENTION

The detailed description set forth below is intended as a description of the presently preferred embodiment of the invention, and is not intended to represent the only form in which the present invention may be constructed or utilized. The description sets forth the functions and sequences of steps for constructing and operating the invention. It is to be understood, however, that the same or equivalent functions and sequences may be accomplished by different embodiments and that they are also intended to be encompassed within the scope of the invention.

Figure 1:
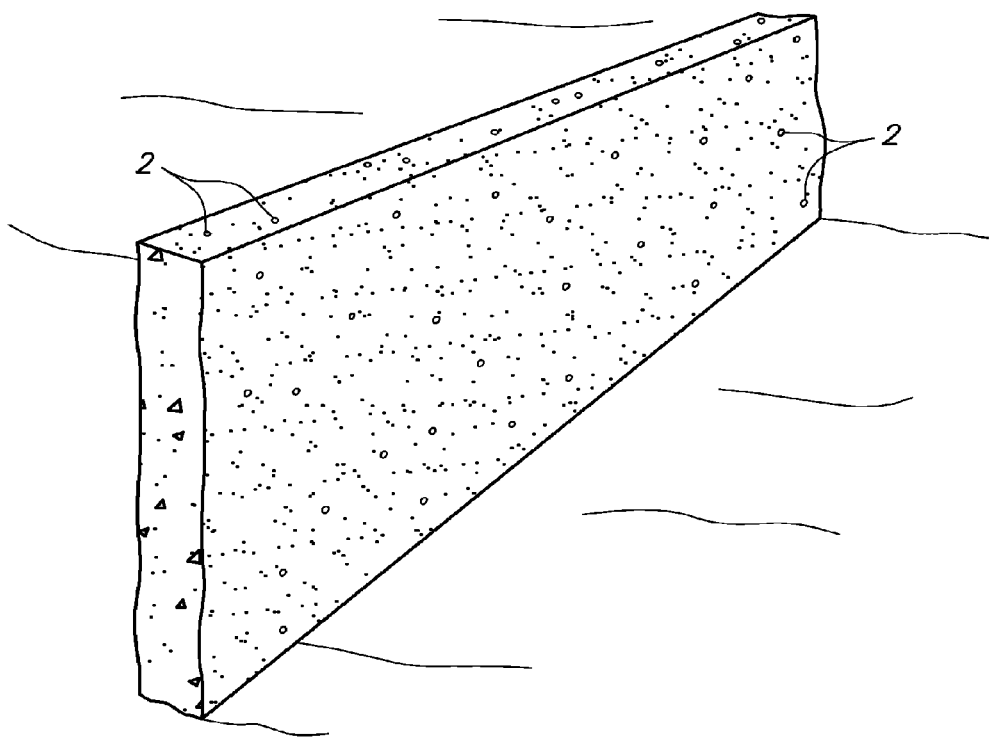
FIG. 1 is a perspective view of a cast in place concrete wall constructed in accordance with techniques known in the prior art.
Figure 2:
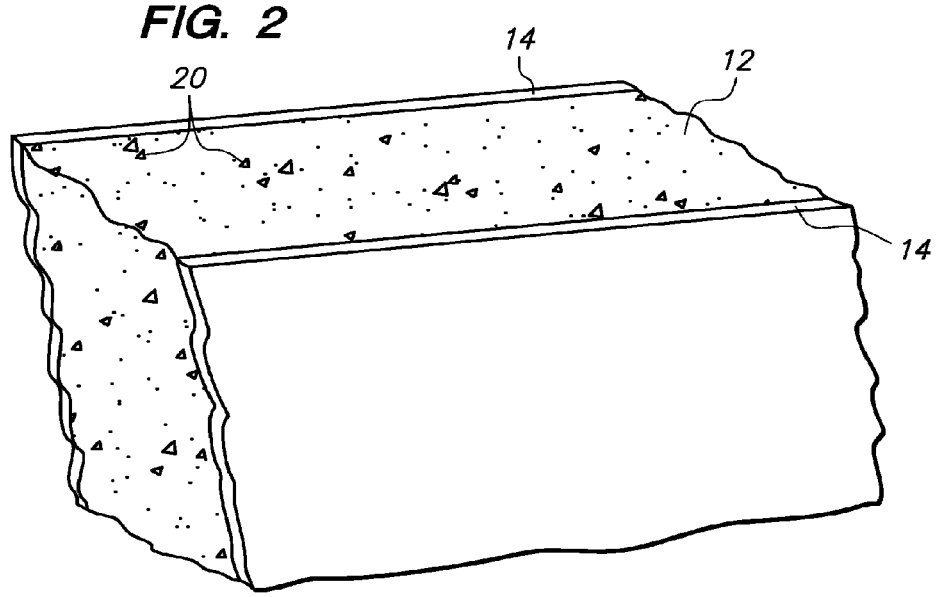
FIG. 2 is a perspective view of a section of concrete poured into a wall form.
Figure 3:
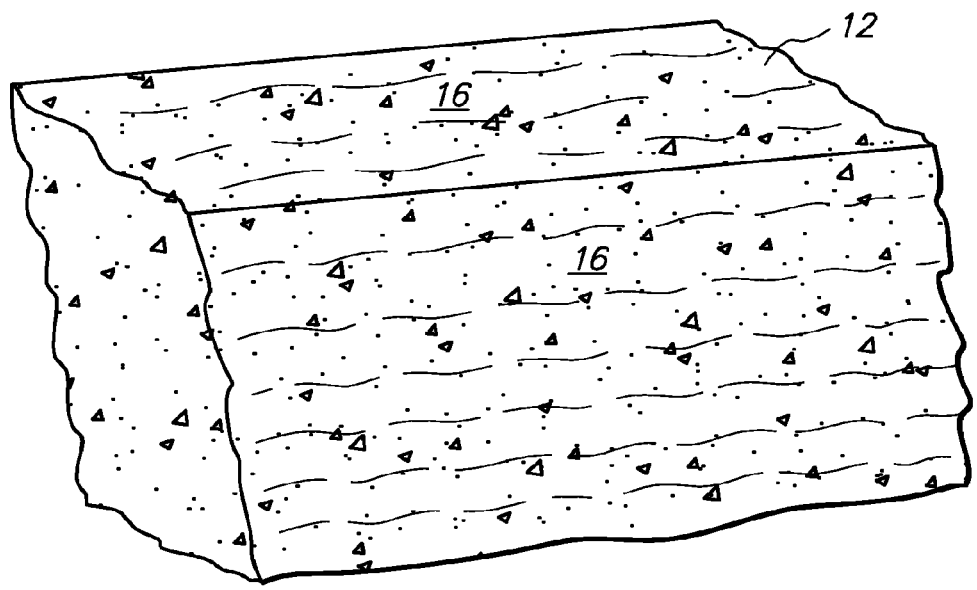
FIG. 3 is a perspective view of a section of the concrete from FIG. 2, wherein the wall form has been removed and a roughened surface has been applied to the cured concrete base structure.
Figure 4:
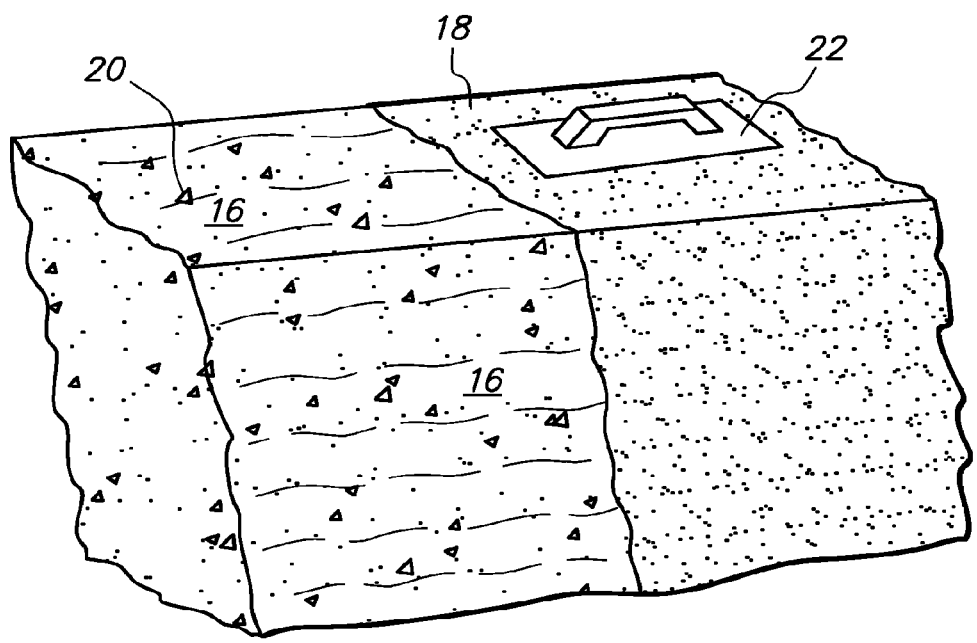
FIG. 4 is a perspective view of a section of the concrete base structure from FIG. 3, wherein a finishing mixture is being applied to the roughened surface at the base structure.

As indicated above, cast in place concrete walls provide numerous advantages over walls constructed from other building materials. In this regard, cast in place walls may be quickly and easily constructed, and provide substantial flexibility in the size and shape of the wall. However, as also indicated above, cast in place walls constructed in accordance with most prior art fabrication methodologies often include an undesirable rough, non-uniform exterior surface texture. In this regard, when the concrete is poured into the corresponding wall form, air may become entrapped in small pockets within the concrete. When the concrete cures and the wall form is removed, these air pockets may appear as inconsistencies on the exposed surfaces of the resultant wall. These inconsistencies in the wall surface are typically considered to be aesthetically undesirable. FIG. 1 illustrates a cast in place wall constructed through the use of known, prior art methodologies. As is shown in FIG. 1, small holes or indentations 2 formed as a result of entrapped air in the concrete poured into wall form used to form the wall are present in various locations on the exposed, exterior surfaces thereof.

The present invention is directed toward creating a cast in place wall having a more uniform texture on its surface, thereby increasing its aesthetic appeal. Referring now to FIGS. 2-5, there is provided a method of constructing a cast in place concrete wall 10 or other concrete structure having a substantially uniform exterior surface texture. Concrete 12 is a commonly used building material that is comprised of cement, water, aggregates, and admixtures. Admixtures are materials that are added to the concrete 12 to give it certain characteristics that it otherwise would not have, such as accelerating or retarding the stetting time, enhancing frost and sulfate resistance, improving workability, and enhancing finishinability. The aggregates may include sand, pieces of gravel and stone of various size and shape, and recycled materials including concrete.

According to one embodiment of the present invention, a wall form 14 is initially constructed in accordance with the desired shape and size of the wall or outer structure. In the preferred embodiment of the invention, the wall form 14 is constructed out of plywood, however, other materials known by those skilled in the art may also be used. After the wall form is constructed, concrete 12 is poured into the wall form 14. In order to enhance the strength of the ultimately formed wall or other structure, re-bar may be placed within the wall form 14 before the concrete 12 is poured therein.

Once the concrete 12 is poured into the wall form 14, it is given a prescribed period of time to cure. During the curing process, the concrete 12 acquires a certain threshold of hardness and strength. Once the concrete 12 at least partially cures, the wall form 14 is removed, thereby exposing the exterior surfaces of the base structure (e.g., a wall, barrier, etc) formed as a result of the curing of the concrete 12. Thereafter, the exposed surfaces of the base structure formed by the cured concrete 12 are subjected to a procedure which creates a roughened surface texture 16 thereon. The roughened surface texture 16 is created to provide a base for facilitating the adhesion of a finishing mixture 18 thereto, as will be described in more detail below. The roughened surface texture 16 may be created through the use of a number of different surface roughening agents or techniques. For example, the roughened surface texture 16 may be achieved through the use of a form retarder or a spray on retarder. A retarder is the substance that slows the hydration, or hardening, of the concrete 12. The roughened surface texture 16 may alternatively be created by sandblasting, acid watching, or chemically etching the exposed surfaces of the base structure formed by the cured concrete 12. Other techniques known by those of skill in the art may also use to facilitate the creation of the roughened surface texture 16.

Subsequent to the creation of the roughened surface texture upon the base structure formed by the cured concrete 12, the finishing mixture 18 described above is applied thereto. The finishing mixture 18 may be created by separating large aggregate 20 present in the concrete 12 from the remainder thereof. Such large aggregate 20 may include large pieces of gravel or crushed stone found in the original mixture of concrete 12 poured into the wall form 14. It is contemplated that by removing the large aggregate 20 from the concrete 12, the resultant finishing mixture 18 will have a more uniform texture.

In accordance with one embodiment of the present invention, it is contemplated that the finishing mixture 18 may be created from the same mix or batch of the concrete 12 originally poured into the wall form 14. The use of such original batch may beneficially allow for color consistency between the base structure formed from the cured concrete 12 and the finishing mixture 18 subsequently applied to the exposed exterior surfaces of such base structure having the roughened surface texture 16 formed thereon in the above-described manner. In accordance with another embodiment of the present invention, the finishing mixture 18 may be created from a separate mix of the concrete 12.

Figure 5:
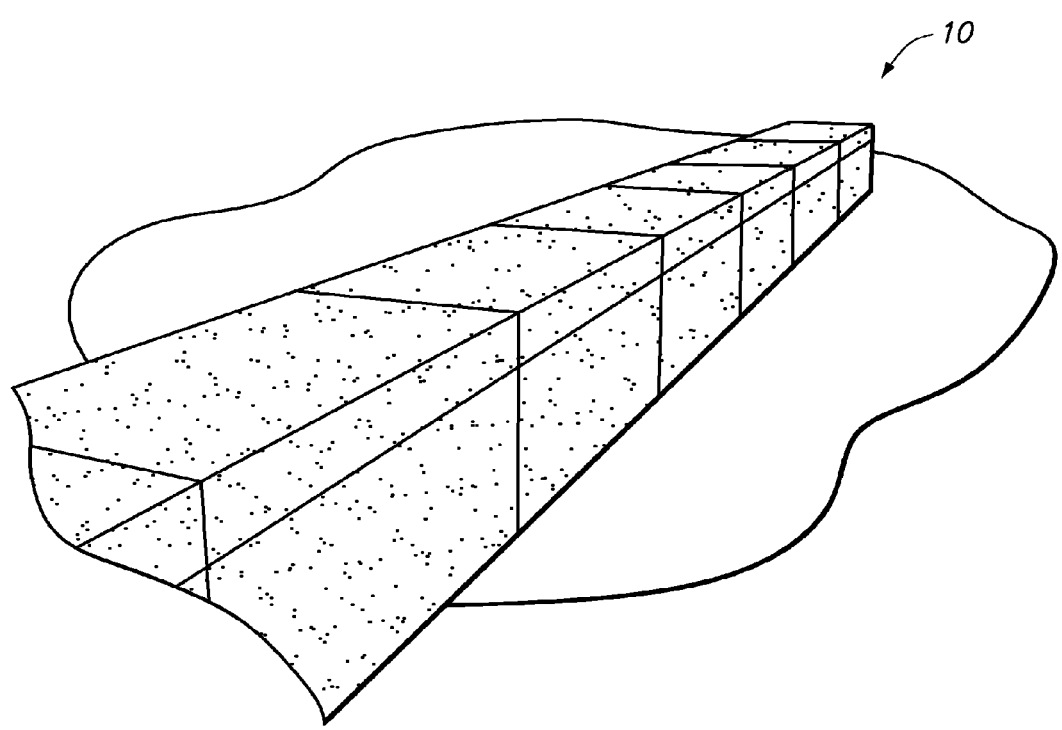
FIG. 5 is a perspective view of a concrete wall constructed in accordance with the method of the present invention.

As indicated above, the finishing mixture 18 is applied to the roughened surface texture 16 of the base structure formed by the cured concrete 12, with the cured finishing mixture 18 ultimately defining the uniformly textured exterior surfaces of a final concrete structure comprising a combination of the base structure and the hardened finishing mixture 18. The finishing mixture 18 may be applied to the roughened surface texture 16 through the use of a float. In this regard, the finishing mixture 18 is worked into the roughened surface texture 16 until the desired finished surface texture is achieved. At this point, the finishing mixture 18 may be left alone to cure. However, it is contemplated that the finishing mixture 18 may be troweled before curing to achieve a harder texture. In addition, after the finishing mixture 18 fully cures/hardens, it may be acid washed to achieve certain textured features. An exemplary wall 10 formed in accordance with the aforementioned methodology and possessing the smooth, uniformly textured exterior surfaces features highlighted above is shown in FIG. 5. However, as also indicated above, the methodology of the present invention may also be used to form a plurality of different structures other than the wall 10 shown in FIG. 5.

The above description is given by way of example, and not limitation. Given the above disclosure, one skilled in the art could devise variations that are within the scope and spirit of the invention disclosed herein. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A method of forming a concrete structure comprising the steps of:
    disposing a first concrete mixture into a form, wherein the first concrete mixture includes large aggregate;
    allowing the first concrete mixture to at least partially harden and form a concrete base structure;
    providing a preliminary finishing concrete mixture including large aggregate;
    creating a final finishing mixture by separating large aggregate from a portion of the preliminary finishing concrete mixture; and
    applying the final finishing mixture to an exterior surface of the base structure.

2. The method of claim 1, further comprising the step of creating a roughened exterior surface.

3. The method of claim 1, further comprising the step of removing the form.

4. The method of claim 1, further comprising the step of troweling the finishing mixture once applied to the base structure.

5. A method of forming a concrete structure having a substantially uniform exterior surface texture, comprising the steps of:
    allowing a first mixture of concrete including large aggregate to at least partially harden and form a concrete base structure;
    creating a finishing mixture by separating the large aggregate from one of a portion of the first concrete mixture and a second concrete mixture; and
    applying the finishing mixture to the base structure.

6. The method of claim 5 further comprising the step of disposing the first mixture of concrete into a form.

7. The method of claim 5 further comprising the step of creating a roughened exterior surface on the base structure.

* * * * *